June 17, 1930.          A. WIEDNER          1,764,921
ELECTRIC MOTOR
Filed Nov. 16, 1928

Inventor
Arthur Wiedner
By his Attorney

Patented June 17, 1930

1,764,921

UNITED STATES PATENT OFFICE

ARTHUR WIEDNER, OF PORT LAVACA, TEXAS

ELECTRIC MOTOR

Application filed November 16, 1928. Serial No. 319,754.

This invention relates to electric motors, and more particularly to electric motors of the impulse type adapted to be operated on low voltage.

The usual high voltage motor requires considerable care in its manufacture, and provisions must be made for heat and other losses in the armature windings and core. Consequently such a motor would not operate efficiently on low voltage, and since there are many instances in which a low voltage motor is desirable, it is an object in this invention to provide an electric motor of the impulse type which may be efficiently operated on low voltage with small current consumption.

A further object of the invention is the provision of a motor which may be easily manufactured at a small cost and in which the heat and core losses are a minimum.

These and other objects are attained by the novel construction, combination and arrangement of parts hereinafter described and shown in the accompanying drawing, constituting a material part of this disclosure and in which.

Figure 1:
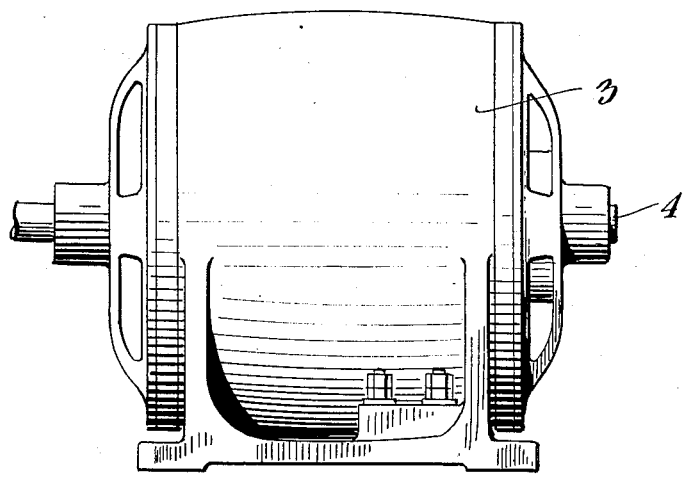
Figure 1 is an elevational view of the electric motor.

Referring to the drawings, the motor is shown to have a casing 3 in which is journalled a shaft 4. Fixed to the shaft 4 to rotate therewith is a disc 5 having a plurality of projections 6 (eight in number in the instant case) on its periphery.

The projections 6 are adapted to engage the hooked ends 7 of levers 8, to intermittently raise the latter as the shaft is rotated. Lever 8 is pivoted to a support 9, and the hooked end 7 is normally held in engagement with the disc 5 by the action of the spring 10 attached to one end of lever 8 and to support 9.

The support 9 is attached to a stationary bar 11 upon which is mounted a contact 12 electrically connected to the terminal A of the source of electric current.

The lever 5 is connected by a lever 13 to the solenoids of the electromagnets 14 and 15, which in turn are electrically connected to the terminal B of the source of electric current. In the instant case, three pairs of electromagnets 14 and 15 are employed, the electromagnets being mounted on the interior of the casing 3.

Figure 2:
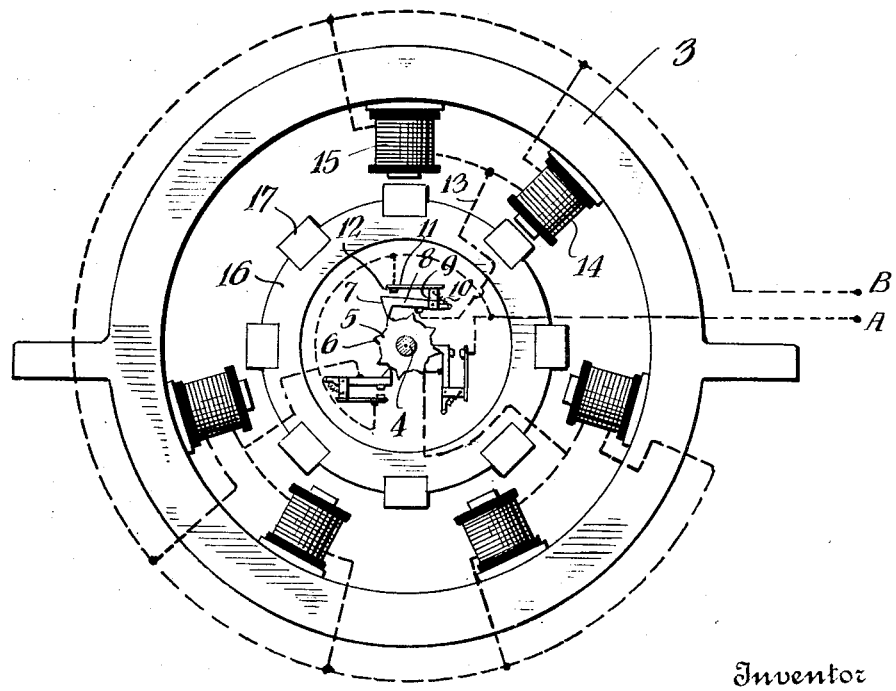
Figure 2 is a diagrammatic end view of the motor showing the electrical connections.

The armature 16 of the motor has a plurality of bars 17 of magnetic material embedded in the periphery, there being eight such bars shown in Figure 2 of the drawing.

In operation, as the shaft 4 is rotated, disc 5 will rotate therewith and the projection will engage the hooked ends 7 of the levers 8, to raise the latter into engagement with the contacts 12 to intermittenly close the electrical circuits through the electromagnets 14 and 15. When the electromagnets are energized, they attract the bars 17 and continue the rotation of the armature. As soon as the bars are brought beneath the electromagnets 14 and 15, the circuit is broken by the distributor disc 5, and another set of electromagnets attract another set of bars to continue the rotation.

From the above description it will be seen that the armature is rotated by intermittent magnetic impulses and consequently a high speed may be attained with a low voltage and small current consumption, the latter, however, depending upon the load.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent is:

An electric motor of the impulse type comprising a casing, a shaft journaled therein, a disc on said shaft rotating therewith, a plurality of projections formed on the periphery of said disc, levers having hooked ends adapted to engage said projections intermittently during the rotation of said shaft, for raising said levers, supports to which said levers are pivotally connected and springs attached to said supports and levers for holding the hooked ends thereof normally in engagement with said disc, sets of stationary bars to which said supports are attached, a contact on the bar of each set, electrically connected to one pole of a source of current, sets of electromagnets, one of said levers connected to the solenoids of two of said sets of said electromagnets, connections between said solenoids and the other pole of said source of current, a plurality of magnetc bars mounted on the armature of the motor and embedded in the periphery thereof for intermittently closing electrical circuits through said electromagnets to energize the same for attracting the bars, and rotating the armature, said disc during its rotation interrupting said circuit for allowing another set of electromagnets to attract another set of bars for continuing the rotation of the armature.

In witness whereof I have affixed my signature.

ARTHUR WIEDNER.